United States Patent [19]

Torma

[11] 4,242,313

[45] Dec. 30, 1980

[54] PROCESSES FOR THE RECOVERY OF ALUMINA FROM FLY ASH AND PRODUCTION OF CEMENT CONSTITUENTS

[75] Inventor: Arpad E. Torma, Socorro, N. Mex.

[73] Assignee: Extraction Research & Development, Inc., Albuquerque, N. Mex.

[21] Appl. No.: 132,666

[22] Filed: Mar. 21, 1980

Related U.S. Application Data

[63] Continuation-in-part of Ser. No. 38,929, May 14, 1979, abandoned.

[51] Int. Cl.³ .............................................. C01F 7/26
[52] U.S. Cl. .................................... 423/112; 423/128; 423/132; 106/103
[58] Field of Search ............... 423/111, 112, 128, 132; 106/103

[56] References Cited

U.S. PATENT DOCUMENTS

| 2,951,743 | 9/1960 | Kretzschmar | 423/128 |
| 3,254,948 | 6/1966 | Stromberg et al. | 423/112 |
| 3,393,975 | 7/1968 | Mitchell | 423/128 |
| 3,759,730 | 9/1973 | Trief | 106/103 |
| 3,983,212 | 9/1976 | Lowenstein | 423/128 |
| 4,048,285 | 9/1977 | Szepesi et al. | 423/132 |
| 4,113,833 | 9/1978 | Eremin et al. | 423/111 |

OTHER PUBLICATIONS

Condry, "Coal Research Bureau, Report No. 130", 1976, West Va. Univ., Morgantown, W. Va., 8 pages.

Primary Examiner—Herbert T. Carter
Attorney, Agent, or Firm—Walter R. Keller

[57] ABSTRACT

Processes for the production of alumina and cement constituents from fly ash, in which the fly ash is subjected to magnetic separation removing magnetic constituents; the remaining non-magnetic fraction of fly ash is then mixed with a calcining agent and water, pelletized, dried and calcined, cooled, and then either acid cured or subjected to a hydrothermic shock treatment in sulfuric acid; the mixture is then diluted with water, filtrated, purified by a solvent extraction process, and evaporated yielding aluminum sulfate, which is then subjected to liquid-solid separation and decomposed at an increased temperature at which the sulfur in the form of sulfur oxide gases and the water vapor is driven off, alumina remains. The leach residue of the alumina extraction yields useful material for cement production.

1 Claim, 1 Drawing Figure

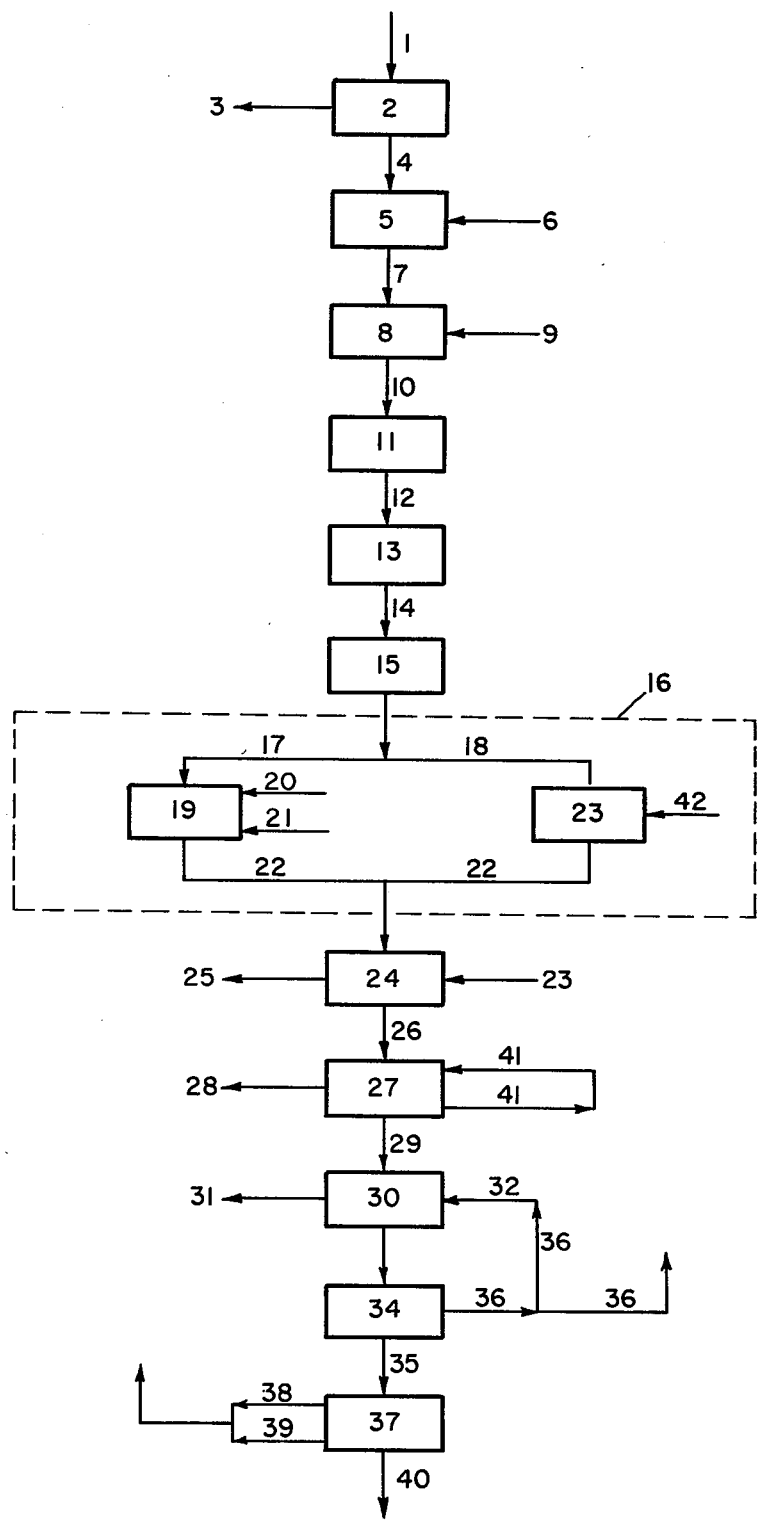

PROCESSES FOR THE RECOVERY OF ALUMINA FROM FLY ASH AND PRODUCTION OF CEMENT CONSTITUENTS

This is a continuation-in-part of application Ser. No. 038,929 filed May 14, 1979, now abandoned.

SUMMARY

Fly ash is essentially, until this invention, a waste product of burning coal. Power plants which burn coal, remove and collect the fly ash from the chimney gases before the gases are allowed to escape to the atmosphere. Fly ash is primarily vitrified matter composed of silicon dioxide and alumina, with small amounts of calcium, iron, titanium, silver, and potassium. The vitrified nature of the fly ash, microscopic very hard globules, has heretofore made the extraction of alumina therefrom extremely difficult, and virtually infeasible on a commercial basis. It is an object of this invention to provide a commercially practical method of extracting the alumina from the fly ash, rendering the fly ash a desireable raw material instead of a waste product to be discarded. It is a further object of this invention to provide a process which is amenable to either a batch or continuous process to enhance the commercial feasibility of the invention. It is a further object of this invention to result in residues and by-products which are useful and commercially practical, especially but not limited to constituents of cement, so as to reduce to a virtual absolute minimum; waste products, disposal and pollution problems. It is a further object of this invention to achieve very high degree of recovery of alumina from fly ash, in excess of 99%.

BACKGROUND OF THE INVENTION

1. Field of the Invention

This invention relates generally to metallurgical processes, and more particularly to a process for the recovery of alumina from fly ash.

2. Description of Prior Art

It has been known for many years that the fly ash from coal burning power plants contained relatively high amounts of alumina; on the order of thirty percent by weight of the fly ash being alumina. The fly ash, being predominately vitrified matter, is a very hard substance, in the form of microscopic globules of various sizes which are relatively impervious to most chemical reactions. SZEPESI, U.S. Pat. No. 4,048,285 describes a process for recovery of alumina from fly ash by mixing a prescribed amount of CaO or the equivalent amount of $Ca(OH)_2$ for the amount alumina in the dry fly ash, and utilizing a steam treatment at 80°-100° C., then dissolving in nitric acid for one hour, followed by filtration and precipitation with ammonia. SZEPESI reports that 95% of the $Al_2O_3$ content of the fly ash can be obtained as iron free alumina.

MITCHELL, U.S. Pat. No. 3,393,975 discloses a process for recovery of alumina from fly ash utilizing magnetic separation to remove a magnetic iron fraction, and subjecting the non-magnetic alumina containing fraction to continuous counter current leaching in sulfuric acid. This process does not teach the use of calcining for processing fly ash, but does teach calcining if treating flint clay. The calcining of flint clay is conducted at 750° C. for thirty minutes.

Neither MITCHELL nor SZEPESI teach the high temperature calcining of the present invention nor the acid curing or hydrothermic shock treatment in the sulfuric acid treatment.

BRIEF DESCRIPTION OF THE DRAWINGS

FIG. 1 is a block flow diagram of the process.

DESCRIPTION OF THE PREFERRED EMBODIMENT

This invention is processes which utilize fly ash 1, as a raw material. Finely powdered bottom ash may also be used as a raw material, and is understood to be included herein in the term fly ash 1. The composition of fly ash 1 varies some what depending on the fuel burned, but the main elements are silicon, aluminum, and minor elements calcium, iron, titanium, silver and potassium. The major compounds in fly ash 1 are $SiO_2$ approximately 40% and $AL_2O_3$ approximately 31%. As shown in FIG. 1, the fly ash 1 is first subjected to a magnetic separation step 2 which separates the fly ash 1 into an iron-bearing magnetic fraction 3 and a non-magnetic fraction 4 which contains alumina. The non-magnetic fraction 4 is dry mixed 5 with a calcining agent 6 in proportions so that the ratio by weight of CaO to $SiO_2$ is between 1.4 and 2.0 with the optimum being 1.8. The calcining agent can be CaO, called lime, calcium oxide, or calcined limestone; or $Ca(OH)_2$ also called lime; or $CaCO_3$ called limestone; as long as equivalent amounts are used to retain the proper $CaO/SiO_2$ ratio. The mixing 5 yields a dry mixture 7 which is then pelletized 8 with the addition of sufficient water 9. Satisfactory results have been obtained by pelletizing 8 in rotating drum pelletizer, and the addition of approximately 60% by weight of water 9. Pelletizing 8 is controlled so that pellets 10 are formed which are approximately spherical and one and a quarter centimeters in diameter.

The pellets 10 are then dried 11 which removes approximately twenty percent of the water yielding dried pellets 12. The dried pellets 12 are then calcined 13 in an electric furnace for five to 30 hours, 28 hours being satisfactory, at a temperature between 900° C. and 1200° C. with the optimum being 1100° C. It should be pointed out that the drying 11 and calcining 13 may be accomplished together in a two step furnace, or a one step furnace with preheating on a conveyor belt or other means, and there is no requirement for cooling after drying 11. Thus, in practice the drying 11 may be combined with the calcining 13.

The determination of the satisfactory and optimum $CaO/SiO_2$ ratios was made in laboratory tests, using fly ash 1 which has not been subjected to magnetic separation 2, by varying the $CaO/SiO_2$ ratio and the calcining 13 temperature using an acid curing 17 technique described hereinafter; these laboratory test result are shown in Table 1:

TABLE 1

| Ration $CaO/SiO_2$ | Calcining Temperature °C. | Alumina Extraction % Recovered |
| --- | --- | --- |
| 1.4 | 900 | 50.8 |
| 1.6 | 900 | 55.7 |
| 1.8 | 900 | 56.3 |
| 2.0 | 900 | 60.2 |
| 1.4 | 1000 | 80.3 |
| 1.6 | 1000 | 88.9 |
| 1.8 | 1000 | 92.2 |
| 2.0 | 1000 | 88.3 |
| 1.4 | 1100 | 62.3 |
| 1.6 | 1100 | 62.3 |
| 1.8 | 1100 | 72.1 |
| 2.0 | 1100 | 64.4 |

TABLE 1-continued

| Ration CaO/SiO$_2$ | Calcining Temperature °C. | Alumina Extraction % Recovered |
|---|---|---|
| 1.4 | 1200 | 67.2 |
| 1.6 | 1200 | 64.5 |
| 1.8 | 1200 | 66.6 |
| 2.0 | 1200 | 62.3 |

At temperatures of 1200° C. and above during calcining 13, the dried pellets 12 become fused and vitrify upon cooling, detracting from the processes. The calcining 13 results in substantial decomposition of the almost spherical fly ash 1 globules, into calcined fly ash 14. The calcined fly ash 14 is then cooled 15 and subjected to acid treatment 16. The acid treatment 16 can be either acid curing 17 or hydrothermic shock treatment 18.

In the acid curing 17, the calcined fly ash 14 is cooled 15 to room temperature and poured into a reactor 19 equipped with agitation containing concentrated sulfuric acid 20 and allowed to cure for 24 to 28 hours; and then under agitation is diluted by the addition of approximately four times as much water 21 as there was concentrated sulfuric acid 20, yielding a dilute slurry 22.

In the hydrothermic shock treatment 18, the calcined fly ash 14 is cooled 15 to a temperature between 300° C. and 400° C. with the optimum being 350° C., and poured into a reactor 23 equipped with agitation containing dilute sulfuric acid 42, of approximately one molar strength, said dilute sulfuric acid 42 being at a temperature of between 70° C. and 85° C., which is then continued to be agitated for 30 to 40 minutes yielding the dilute acid slurry 22. Using the previously determined optimum CaO/SiO$_2$ ratio of 1.8, laboratory tests using fly ash 1 which had not been subjected to magnetic separation 2, and using hydrothermic shock treatment 18, and the other steps in the processes, verification of the optimum calcining 13 temperature and demonstration of the effect of hydrothermic shock treatment 17 was obtained as shown in Table 2, below:

TABLE 2

| CaO/SiO$_2$ ration = 1.8) ||
|---|---|
| Calcining Temperature °C. | Alumina Extraction % Recovered |
| 900 | 43.7 |
| 1000 | 93.8 |
| 1100 | 99.4 |
| 1200 | 90.4 |
| 1300 | 48.2 |

The diluted slurry 22 then passes to a stirred leach tank, where its pH may be raised to 2.0 by the addition of lime CaO, 23 as required by a purification step 27, and the diluted slurry 22 is then subjected to solid liquid separation by filtration 24 which filters out solids 25, leach residue, and leaves a pregnant solution 26. The solids 25 have a very high calcium silicate and calcium sulfate content, some undissolved fly ash 1, but very little alumina 40 content. The solids 25 are therefore commercially useable in the manufacture of cement as will be discussed hereinafter.

The pregnant solution 26 is then selectively subjected to the purification step 27. The purification step 27 functions best when the pH of the pregnant solution 26 is 2.0; thus whenever the purification step 27 is to be utilized, the addition of lime 23 to the diluted slurry 22 is required. The purification step 27 involves the removal of dissolved impurities from the pregnant solution 26 in a suitable organic solvent. The processes were carried out with a large number of organic solvents including carboxilic (aliphatic and aromatic) acids; primary, secondary, tertiary and quaternary amines; and a variety of phosphorous containing extractants. The best results were obtained with Di(2-ethylhexyl) phosphoric acid (D2EHPA). The purification 27 of the pregnant solution 26 yields a small amount of scrub solution 28 and purified pregnant solution 29; the solvent 41 being recycled within the purification step 27. The effectiveness of the purification step 27 is shown in Table 3, below, which shows the amount of impurities iron, titanium, and calcium remaining in the pregnant solution 26 and the purified pregnant solution 29, when the magnetic separation 2 has been omitted.

TABLE 3

| Impurities in pregnant solution (g/l) | Impurities in purified pregnant solution (g/l) |
|---|---|
| Fe 3.50 | Fe 0.10 |
| Ti 0.77 | Ti not detectable |
| Ca 0.04 | Ca 0.53 |

Ordinary magnetic separation 2, will remove ferromagnetic elements such as iron, colbalt, and nickel, but high density magnetic separation 2 will also remove paramagnetic elements such as titanium. Thus, the purification step 27 may be required only infrequently. The purified pregnant solution 29 is then subjected to evaporation 30 which removes water in the form of steam 31, leaving a concentrated solution which is then seeded 32 with aluminum sulfate crystals, yielding an aluminum sulfate suspension 33. The aluminum sulfate suspension 33 is subjected to a solid-liquid separation by centrifugation 34 which results in hydrated crystalline aluminum sulfate 35 and mother liquor 36. The mother liquor 36 is then recycled into the reactor 19 or 23 in the acid curing 17 or hydrothermic shock treatment 18. The mother liquor 36 contains fine particulate of aluminum sulfate in suspension, and thus, a portion of the mother liquor 36 is used for seeding 32. It should be noted here that the recycling of the mother liquor 36 will lead to a buildup of impurities necessitating the selective use of the purification step 27.

The hydrated crystalline aluminum sulfate 35 is then calcined 37 at 1000° C. driving off oxides of sulfur 38 and water of hydration 39 as water vapor leaving alumina 40. The decomposition products water 39 and sulfur oxide gasses 38 are reconverted into sulfuric acid and recycled into the processes.

Using the entire processes, virtually all of the alumina 40 is recoverable from the non-magnetic fraction 4 and the resultant alumina 40 is very pure. Even so, without the magnetic separation 2, recovery of 99.4% of the alumina 40 in the fly ash 1 resulted, and the alumina 40 was of very high purity with but only trace amounts of impurities.

By using CaCO$_3$ as the calcining agent 6, a chemical reaction during calcining 13 takes place as follows:

$$CaCO_3 \rightarrow CaO + CO_2$$

and $$X\ CaO + Y\ SiO_2 + Z\ Al_2O_3 \rightarrow A\ (CaO).SiO_2 + B\ (CaO)_2.SiO_2 + C\ (CaO)_3.SiO_2 + D\ (CaO).Al_2O_3$$

As is indicated, a variety of calcium silicates A, B, and C as well as calcium aluminate, D are formed. In the acid curing 17 and the hydrothermic shock treatment 18 a chemical reaction occurs as follows:

$$CaO + H_2SO_4 \rightarrow CaSO_4 + H_2O$$

and $$(CaO)_3 \cdot Al_2O_3 + 6H_2SO_4 \rightarrow Al_2(SO_4)_3 + 3CaSO_4 + 6H_2O$$

The calcium sulfate is insoluble and it remains in the diluted slurry 22 and is removed as solids 25. Calcium sulfate is an important ingredient in Portland cement and many other types of cement. Type K cement consists primarily of calcium silicates, anhydrous calcium alumino-sulfate, calcium sulfate and free lime. Type M cement contains Portland cement, calcium aluminate and calcium sulfate. It is obvious that the solids 25 are very useful in cement production.

It can be seen that the processes convert virtually all input materials into useable products and recycles many of the by-products. It is also apparent that the processes can be batch or continuous. The invention could substantially reduce dependence of the United States on imported raw material for the production of aluminum.

I claim:

1. A process for extracting alumina and cement constituents from fly ash which comprises;

a. subjecting the fly ash to magnetic separation by known methods yielding an iron-bearing magnetic fraction and a nonmagnetic fraction, and b. dry mixing the nonmagnetic fraction with a calcining agent, CaO, wherein the ratio of CaO to $SiO_2$ by weight is between 1.4 and 2.0, and said dry mixing yielding a dry mixture, and c. pelletizing the dry mixture by adding a sufficient amount of water and forming pellets which are approximately spherical, and d. drying and calcining the pellets by subjecting the pellets to a temperature of between 900° C. and 1200° C. for between five and thirty hours and yielding calcined fly ash, and e. acid treating the calcined fly ash, resulting in diluted slurry, and f. selectively increasing the pH of the diluted slurry to 2.0 by the addition of lime, and g. subjecting the diluted slurry to a filtration yielding solids and a pregnant solution, and h. selectively subjecting the pregnant solution to a purification step using an organic solvent, yielding scrub solution and purified pregnant solution, and i. subjecting the purified pregnant solution to evaporation, removing water and seeding the purified pregnant solution with aluminum sulfate crystals, yielding aluminum sulfate suspension, and j. subjecting the aluminum sulfate suspension to a liquid-solid separation which yields a mother liquor and hydrated crystalline aluminum sulfate, and k. calcining the crystalline aluminum sulfate at approximately 1000° C. which drives off the sulfur oxides and water of hydration and yields alumina.

* * * * *